(12) United States Patent
Donderici et al.

(10) Patent No.: US 10,317,565 B2
(45) Date of Patent: Jun. 11, 2019

(54) INDUCTION LOGGING BOREHOLE CORRECTION FOR WATER-BASED MUD

(71) Applicant: HALLIBURTON ENERGY SERVICES, INC., Houston, TX (US)

(72) Inventors: Burkay Donderici, Houston, TX (US); Glenn Andrew Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/329,712

(22) PCT Filed: Mar. 10, 2016

(86) PCT No.: PCT/US2016/021811
§ 371 (c)(1),
(2) Date: Jan. 27, 2017

(87) PCT Pub. No.: WO2017/155537
PCT Pub. Date: Sep. 14, 2017

(65) Prior Publication Data
US 2018/0038987 A1 Feb. 8, 2018

(51) Int. Cl.
*G01V 3/38* (2006.01)
*G01V 3/28* (2006.01)

(52) U.S. Cl.
CPC . *G01V 3/38* (2013.01); *G01V 3/28* (2013.01)

(58) Field of Classification Search
CPC .......... E21B 47/122; G01V 3/28; G01V 3/26; G01V 3/265; G01V 3/38; G01V 11/00; G01V 11/002; G01R 27/22; G01R 27/20
See application file for complete search history.

(56) References Cited

U.S. PATENT DOCUMENTS

| 5,041,975 A | 8/1991 | Minerbo et al. |
| 6,381,542 B1 | 4/2002 | Zhang et al. |

(Continued)

FOREIGN PATENT DOCUMENTS

| EP | 2570825 | 3/2013 |
| WO | 2011/123379 | 10/2011 |

(Continued)

OTHER PUBLICATIONS

PCT International Search Report and Written Opinion, dated Dec. 2, 2016, Appl No. PCT/US2016/021811, "Induction Logging Borehole Correction for Water-Based Mud," Filed Mar. 10, 2016, 11 pgs.

(Continued)

*Primary Examiner* — Son T Le
(74) *Attorney, Agent, or Firm* — Benjamin Fite; C. Tumey Law Group PLLC (57) ABSTRACT

A method of borehole correction for water-based mud includes conveying an induction logging tool along a borehole through a formation, obtaining one or more formation measurements using the tool, obtaining a water-based mud conductivity, performing an oil-based mud inversion on the formation measurements to determine an inverted formation conductivity, calculating a corrected formation conductivity using the water-based mud conductivity and the inverted formation conductivity, and displaying a log based at least in part on the corrected formation conductivity.

25 Claims, 6 Drawing Sheets

(56) References Cited

U.S. PATENT DOCUMENTS

| | | |
|---|---|---|
| 6,919,724 B2 | 7/2005 | Cheung et al. |
| 7,043,370 B2 | 5/2006 | Yu et al. |
| 7,612,566 B2 | 11/2009 | Merchant et al. |
| 7,629,791 B2 | 12/2009 | Bespalov et al. |
| 7,659,722 B2 * | 2/2010 | Bittar ............... G01V 3/28 324/337 |
| 8,011,238 B2 | 9/2011 | Hanson |
| 8,060,309 B2 | 11/2011 | Xue et al. |
| 8,112,227 B2 | 2/2012 | Rabinovich et al. |
| 8,200,437 B2 | 6/2012 | Davydycheva et al. |
| 8,571,797 B2 | 10/2013 | Wu et al. |
| 2004/0104726 A1 | 6/2004 | Chemali et al. |
| 2004/0245991 A1 | 12/2004 | Hayman et al. |
| 2006/0065394 A1 | 3/2006 | Clark et al. |
| 2006/0155471 A1 * | 7/2006 | Tabarovsky ......... G01V 3/28 702/6 |
| 2007/0029083 A1 | 2/2007 | Folberth |
| 2010/0156424 A1 * | 6/2010 | Bittar ............... G01V 3/28 324/339 |
| 2011/0140701 A1 * | 6/2011 | Legendre ............ G01V 3/28 324/339 |
| 2013/0073207 A1 | 3/2013 | Ganz |
| 2013/0080058 A1 | 3/2013 | Wu et al. |
| 2014/0324353 A1 * | 10/2014 | Hou ................... G01V 3/28 702/7 |

FOREIGN PATENT DOCUMENTS

| | | |
|---|---|---|
| WO | 2014/011190 | 1/2014 |
| WO | 2015/038099 | 3/2015 |

OTHER PUBLICATIONS

Hou, Junsheng, et al., "A New Multi-Frequency Triaxial Array Induction tool for Enhancing Evaluation of Anisotropic Formation and its Field Testing," SPWLA 54th Annual Logging Symposium, 16 pgs., Jun. 22-26, 2013.

* cited by examiner

INDUCTION LOGGING BOREHOLE CORRECTION FOR WATER-BASED MUD

BACKGROUND

In the oil and gas industry, induction logging tools are frequently used to provide an indication of the electrical resistivity of rock formations surrounding a borehole. Such information regarding resistivity helps engineers to ascertain the presence or absence of hydrocarbons. A typical induction logging tool includes a transmitter antenna and a pair of receiver antennas located at different distances from the transmitter antenna along the axis of the tool. The transmitter antenna creates electromagnetic fields in the surrounding formation. In turn, the electromagnetic fields in the formation induce an electrical voltage in each receiver antenna. Due to geometric spreading and absorption by the surrounding formation, the induced voltages in the two receiving antennas have different phases and amplitudes. Experiments have shown that the real and/or imaginary portions of phase and amplitude of the induced voltages in the receiver antennas indicate the resistivity of the formation. The average depth of investigation (as defined by a radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

Many formations are electrically anisotropic, a property which is generally attributable to fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are substantially the same, but resistivity $R_z$ in the z direction is different from $R_x$ and $R_y$. The resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, $\eta$, is defined as $\eta = [R_v/R_h]^{1/2}$. The relative dip angle, $\theta$, is the angle between the tool axis and the normal to the plane of the formation. Resistive anisotropy and relative dip angle each have effects on resistivity logging tool measurements, which may be measured using multi-axial antenna orientations.

The induction tool is typically placed within a borehole drilled into the formation. The borehole may be filled with fluid, sometimes called mud, which gives rise to undesired effects, termed borehole effects, in the logging data due to differences in resistivity between the mud and the formation. The borehole effects are often removed from logging data (i.e., the data are "borehole corrected") using a database compiled for different formation models; however, when such a database presumes the borehole is occupied with oil-based mud ("OBM"), the corrections would result in inaccurate resistivity logs if used without OBM.

BRIEF DESCRIPTION OF THE DRAWINGS

Accordingly, there are disclosed in the drawings and the following description methods and systems for borehole correction for water-based mud ("WBM"). In the drawings.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems providing borehole correction for measurements collected in the presence of water-based mud ("WBM"). Specifically, improved borehole corrections may be applied to data acquired by induction tools in boreholes containing WBM. The resistivity of oil-based mud ("OBM") is on the order of 1000 $\Omega$m while the resistivity of WBM is on the order of 1 $\Omega$m. As such, an OBM database that corrects for borehole effects will not be applicable in a WBM context without modification to the database or to the borehole correction workflow as disclosed herein. Additionally, the modifications herein may be generalized to apply to any mud resistivity in between 1 $\Omega$m and 1000 $\Omega$m, e.g., from conductive WBM to resistive OBM, and their respective emulsions. Finally, the modifications herein may be included in existing workflows and systems, which are predicated on OBM, to minimize disruptions to workflows set in place.

Figure 1:
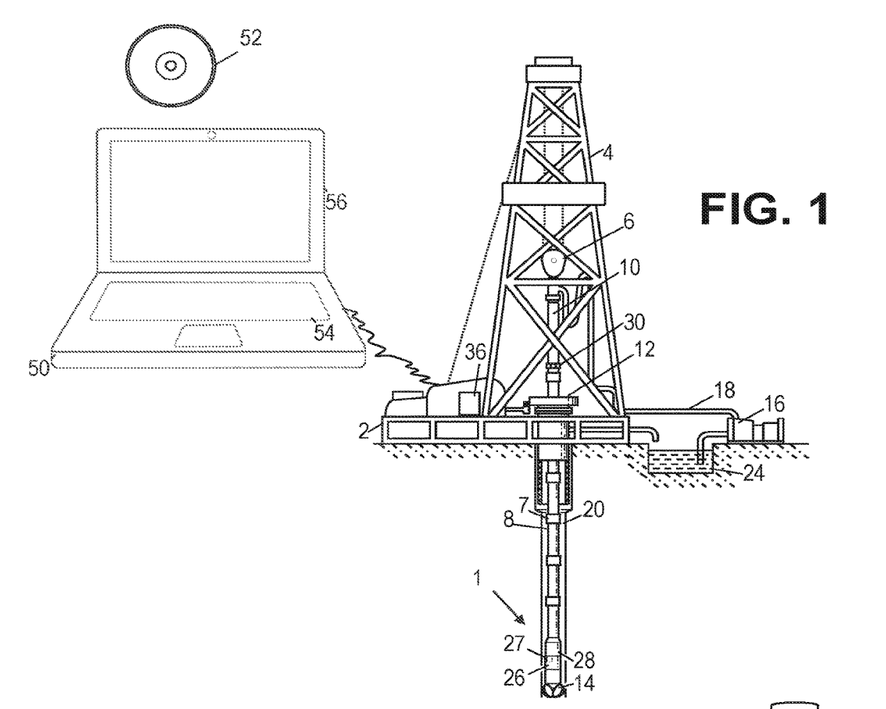
FIG. 1 is a contextual view of an illustrative logging while drilling environment.

To illustrate a context for the disclosed systems and methods, FIG. 1 shows a well during drilling operations that includes a system 1 for borehole correction for WBM including an induction logging tool 26 and one or more processors 27 (located downhole as shown, at the surface, or both). A drilling platform 2 is equipped with a derrick 4 that supports a hoist 6. In at least some embodiments, the platform 2 is located offshore for subsea drilling. Drilling of oil and gas wells is carried out by a string of drill pipes connected together by "tool" joints 7 so as to form a drill string 8. The hoist 6 suspends a kelly 10 that lowers the drill string 8 through a rotary table 12. Connected to the lower end of the drill string 8 is a drill bit 14. The bit 14 is rotated and drilling of the borehole 20 is accomplished by rotating the drill string 8, by use of a downhole motor near the drill bit, or by both methods.

Drilling fluid, such as WBM, is pumped by recirculation equipment 16 through a supply pipe 18, through the kelly 10, and down through the drill string 8 at high pressures and volumes to emerge through nozzles or jets in the drill bit 14.

The fluid then travels back up the hole via the annulus formed between the exterior of the drill string 8 and the borehole wall 20, through a blowout preventer, and into a pit 24 on the surface. On the surface, the fluid is cleaned and then recirculated by recirculation equipment 16.

For a logging while drilling ("LWD") environment, an induction logging tool 26 includes downhole sensors located in the drillstring 8 near the drill bit 14. The sensors may include directional instrumentation. The directional instrumentation measures the inclination angle, the horizontal angle, and the azimuthal angle (also known as the rotational or "tool face" angle) of the LWD tools. As is commonly defined in the art, the inclination angle is the deviation from vertically downward, the horizontal angle is the angle in a horizontal plane from true North, and the tool face angle is the orientation (rotational about the tool axis) angle from the high side of the well bore.

In some embodiments, the downhole sensors are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques may also be used. The receiver 30 communicates the telemetry to an acquisition module 36 coupled to a data processing system 50.

The data processing system 50 may also be coupled to a measurement unit on the platform 2 by a wired connection 49 or wireless connection, and may periodically obtain measurement data from the measurement unit as a function of position and/or time. Among other things, the system 50 processes data received from the acquisition module 36 and generates a representative display for the driller to perceive. Software (represented by information storage media 52) may run on the data processing system 50 to collect the data and organize it in a file or database stored on non-transient information storage media. Specifically, a processor coupled to memory may execute the software. The software may respond to user input via a keyboard 54 or other input mechanism to display data as an image or movie on a monitor 56 or other output mechanism. The software may process the data to optimize oilfield operations as described below. In at least one embodiment, the data processing system 50 is located downhole within a housing able to protect the system 50 from the harsh downhole environment. In another embodiment, processors both at the surface and downhole may work together or independently to obtain, store, and process measurement data.

Figure 2:
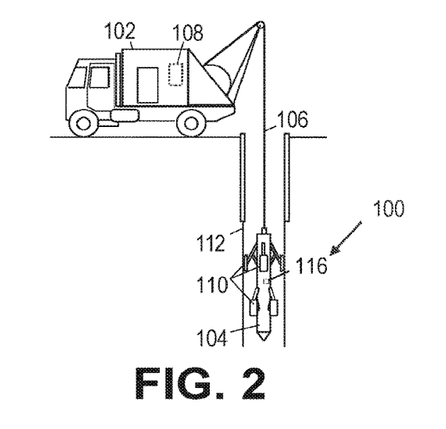
FIG. 2 is a contextual view of an illustrative wireline environment.

FIG. 2 shows a contextual view of an illustrative wireline embodiment that includes a system 100 for borehole correction for WBM including an induction logging tool 104 and one or more processors 116 (located downhole, at the surface, or both). A logging truck 102 may suspend a wireline logging tool 104 on a wireline cable 106 having conductors for transporting power to the tool 104 and telemetry from the tool 104 to the surface. The tool 104 may include sensors that collect downhole measurements for resistivity logging. On the surface, a computer 108 acquires and stores measurement data from the tool 104 as a function of position along the WBM-filled borehole 112 and optionally as a function of azimuth. Though shown as an integrated part of the logging truck 102, the computer 108 can take different forms including a tablet computer, laptop computer, desktop computer, and virtual cloud computer, and executes software to carry out necessary processing and enable a user to view and interact with a display of the resulting information. Specifically, a processor coupled to memory and located at the surface may execute the software. The software may collect the data and organize it in a file or database stored on non-transient information storage media. The software may respond to user input via a keyboard or other input mechanism to display data as an image or movie on a monitor or other output mechanism such as a printer. The software may process the data to optimize oilfield operations as described below. In this way, a multi-dimensional representation or log of the surrounding formation may be obtained, processed, and displayed. Furthermore, the software may issue an audio or visual alert to direct the user's attention to a particular location, result, or piece of data. The processor may perform any appropriate step described below. In at least one embodiment, the tool 104 itself may include the processor coupled with memory to obtain, store, and process measurement data taken by the sensors. In another embodiment, processors both at the surface and downhole may work together or independently to obtain, store, and process measurement data. Centralizers 110 may stabilize the tool 104 within the borehole 112.

Figure 3:
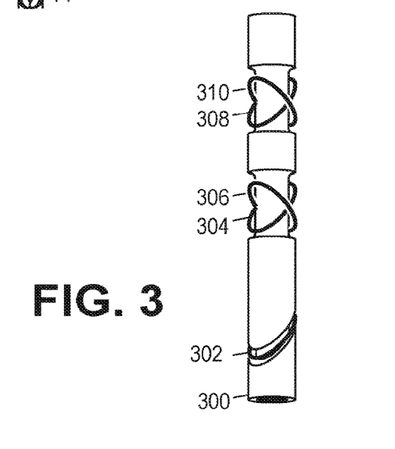
FIG. 3 is an isometric view of an illustrative logging while drilling induction tool having tilted coil antennas.

FIG. 3 shows an illustrative logging while drilling tool 300 having antennas for acquiring induction logging measurements. The logging tool 300 has a tilted transmit antenna 302 and two pairs of tilted receive antennas 304, 306 and 308, 310, thereby providing four transmit-receive antenna pairings. As the tool 302 rotates, it acquires amplitude and phase measurements of each receive antenna's response to transmit antenna 302. In various embodiments, the tool measures in-phase and quadrature-phase components of the receive signals rather than measuring amplitude and phase. In either case, these measurements are collected and stored as a function of the tool's position and rotational orientation in the borehole. The illustrated tool has receive antennas 304 and 308 oriented parallel to the transmit antenna 302, and receive antennas 306 and 310 oriented perpendicular to the transmit antenna. In the illustrated example, each of the antennas share a common rotational orientation, with antennas 302, 304, 308 being tilted at −45° and antennas 306, 310 being tilted at +450 relative to the longitudinal tool axis. Each of the coil antennas surrounding the tool may be mounted in a recess and protected by a non-conductive filler material and/or a shield having non-conducting apertures. The tool body may be primarily composed of steel. The relative tool dimensions and antenna spacings are subject to a great deal of variation depending on the desired tool properties. The distance between the receive coil pairs may be on the order of 0.25 m, while the spacing of the transmit coil to the midpoint between the receiver pairs may vary from about 0.4 m to over 10 m.

Figure 4:
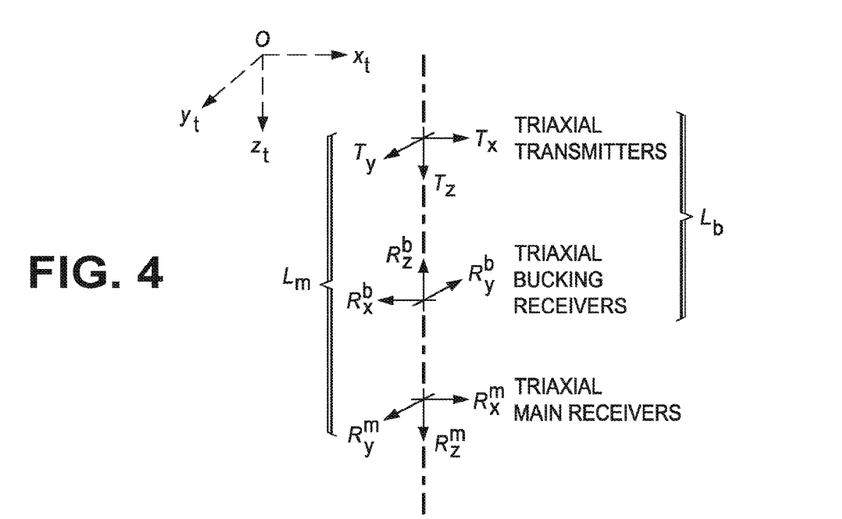
FIG. 4 is a diagram of an illustrative antenna configuration for an induction tool with bucking receivers.

It is noted here that logging measurements may also be acquired by a wireline or slickline deployed system as discussed with respect to FIG. 2. In this case, typically bucking receivers, as illustrated in FIG. 4, are used to cancel out the direct signal, the antennas are not wrapped around a mandrel, and the antennas are oriented in orthogonal directions as shown in FIG. 4. If instead measurements from the logging while drilling configuration of FIG. 1 are collected, the measurements may be converted to those similar to FIG. 4 through use of a combination of multiple measurements at different transmitters and receivers at different rotation angles.

The measurements taken enable a full set of orthogonal coupling component measurements to be obtained at each point along the borehole axis. The orthogonal coupling component measurements correspond to the tool diagram shown in FIG. 4. A triad of transmitters $T_x$, $T_y$, $T_z$, represent magnetic dipole antennas oriented parallel to the tool's x, y, and z axes respectively. A triad of main receivers, $R_x^m$, $R_y^m$, $R_z^m$, similarly represent magnetic dipole antennas oriented along these axes, as do a triad of bucking receivers, $R_x^b$, $R_y^b$, $R_z^b$.

The main receiver triad is spaced at a distance $L_m$ from the transmitter triad, and the bucking receiver triad is spaced at a distance $L_b$ from the transmitter triad. The signal measurements of the bucking receiver triad can be subtracted from the main receiver triad to eliminate the direct signal from the transmitter and increase sensitivity to formation properties.

In various embodiments, 2 to 10 antenna spacings ranging from 6" to 80" may be used with each antenna operating at 2 to 5 frequencies ranging from 5 to 150 kHz.

The magnetic field, h, in the receiver coils with a given signal frequency can be represented in terms of the magnetic moments, m, at the transmitters and a coupling matrix, C, according to equation (1).

$$h = Cm \quad (1)$$

In express form, equation (1) can be written as equation (2).

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix} \quad (2)$$

$M_X$, $M_Y$, and $M_Z$ are the magnetic moments (proportional to transmit signal strength) created by transmitters $T_X$, $T_Y$, and $T_Z$, respectively. $H_X$, $H_Y$, $H_Z$ are the magnetic fields (proportional to receive signal strength) at the receiver antennas $R_X$, $R_Y$, and $R_Z$, respectively.

Figure 10:
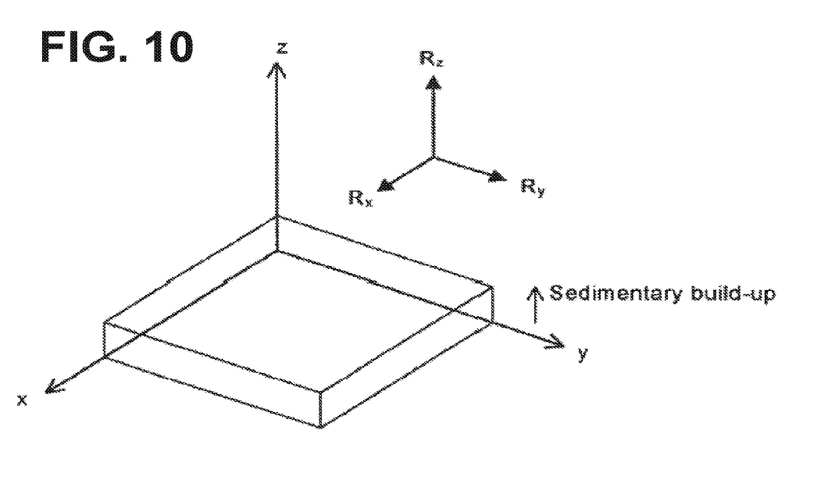
FIG. 10 is a schematic perspective view of a Cartesian coordinate system in a sedimentary earth formation.

FIG. 10 shows a portion of a sedimentary formation bed, with the z-axis oriented perpendicular to the plane of the formation, i.e., in the direction of the sedimentary accretion. The formation resistivity when measured along this axis is often different than formation resistivity measured in the x-y plane. In a dipping bed, the x-axis may be chosen to be oriented in the direction of deepest ascent, i.e., "uphill or downhill". When the formation coordinate system is aligned in this manner, it may be termed a "strike-aligned" coordinate system.

In the antenna configuration of FIG. 4, if each transmitter is fired in turn, and signal measurements are made at each receiver in response to each firing, nine differential measurements ($R^m$-$R^b$) are obtained. These nine measurements enable the determination of a complete coupling matrix C. ($C_{IJ} = a_{IJ} V_{IJ}$, where I is the index for receiver axis x, y, z, and J is the index for transmitter axis x, y, z, $a_{IJ}$ is a constant determined by the tool design, and $V_{IJ}$ is a complex value representing the signal amplitude and phase shift measured by receiver I in response to the firing of transmitter J.) Components of the apparent conductivity tensor $\hat{\sigma}_a$ are proportional to the corresponding components of the coupling matrix. Specifically, each complex-valued magnetic induction (voltage) measurement is linearly transformed (via tool constants) to a real-valued apparent conductivity (so called R- or X-signals), to form a 3×3 apparent conductivity tensor for each logging depth, array, and frequency in the tool coordinate system:

$$\hat{\sigma}_a(r_t) = \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix}, \quad (3)$$

Figure 5:
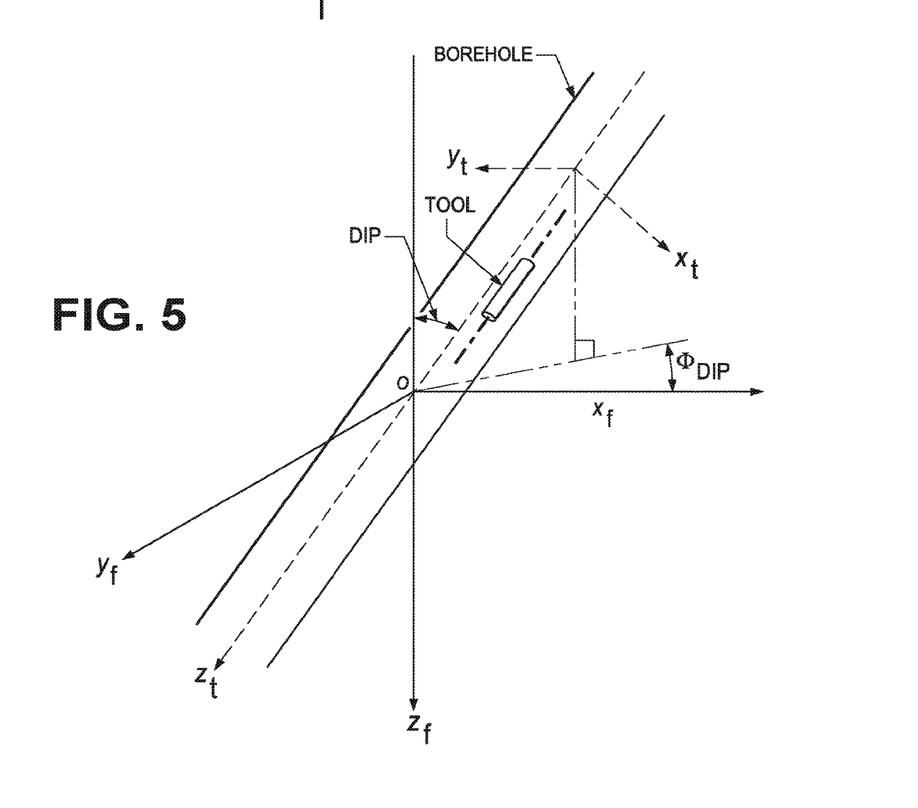
FIG. 5 is a side-view diagram of illustrative relationships between the tool axis, the coil axis, and various angles.

While the above was described with respect to the tool coordinate system, rotational transformations may be applied to determine a corresponding coupling or tensor matrix for any arbitrary tool orientation. FIG. 5 illustrates how the three coordinate systems: tool, formation, and borehole coordinate systems, may be related. The formation coordinate system $x_f$, $y_f$, $z_f$, is tied to the formation, though due to symmetry the x- and y-axes can be shifted without affecting measurement of the formation properties. As the borehole penetrates the formation, the angle between the formation z-axis and the central axis of the borehole is called the dip angle. The dip azimuth $\phi_{dip}$ is the angle between the $x_f$-axis and the projection of the borehole axis into the $x_f$-$y_f$ plane. Because of symmetry, the formation $x_f$-axis can be arbitrarily positioned so that the dip azimuth $\phi_{dip}$ is zero. As such, the borehole $x_b$-axis becomes contained in $x_f$-$z_f$ plane of the formation.

Figure 6:
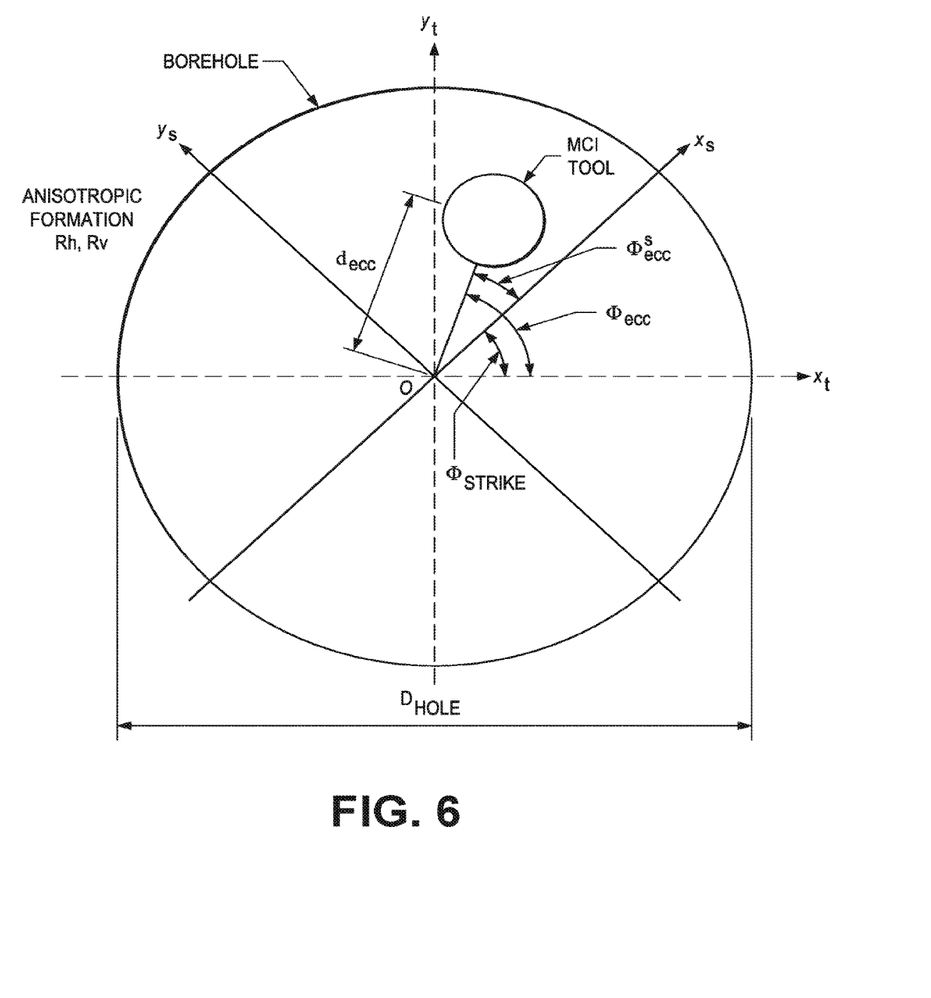
FIG. 6 is a top-view diagram of illustrative relationships between the tool axis, the coil axis, and various angles.

The z-axis of the tool coordinate system coincides with the z-axis of the borehole coordinate system. FIG. 6 shows a number of relationships in the plane of the tool's x- and y-axes. The dip azimuth (or "strike") $\phi_{strike}$ is the angle between the tool's x-axis and the strike-aligned formation x-axis ("$x_s$"). The eccentricity azimuth $\phi_{ecc}$ is the direction of the tool's displacement $d_{ecc}$ from the central borehole axis, relative to the tool's x-axis. When measured relative to the strike-aligned formation x-axis, the eccentricity azimuth is denoted $\phi^s_{ecc}$. The borehole diameter is $D_{hole}$. Treating FIGS. 4-6 as the basis of a model for predicting coupling or tensor component matrix measurements, the model parameters are horizontal resistivity of the formation $R_h$ (or horizontal conductivity $\sigma_h$), vertical resistivity of the formation $R_v$ (or vertical conductivity $\sigma_v$), borehole diameter $D_{hole}$, borehole mud resistivity $R_m$, tool eccentricity displacement $d_{ecc}$, tool eccentricity azimuth $\phi_{ecc}$, relative dip angle $\alpha$, and relative dip azimuth $\phi_{dip}$.

Returning to equation (3), each apparent conductivity can be separated into the superposition of a mud-filled borehole part (m) and a formation (f) part:

$$\sigma_{ij}(r_t) = \sigma_{ij}^f(r_t) + \sigma_{ij}^m(r_t). \quad (4)$$

where i is the receiver orientation (x, y or z), and j is the transmitter orientation (x, y or z). To remove undesired borehole effects in a borehole correction algorithm (which assumes OBM), $\sigma_{ij}^m$ may be eliminated with a borehole correction $\delta\sigma_{ij}$ such that the scalar apparent conductivity $\sigma'_{ij}$ equals the apparent formation conductivity:

$$\sigma'_{ij}(r_t) = \sigma_{ij}(r_t) - \delta\sigma_{ij} \approx \sigma_{ij}^f(r_t). \quad (5)$$

However, in a WBM environment (not assuming OBM) when the conductivity of the mud is equal to the conductivity of the formation, $\sigma_m = \sigma_f$, the borehole correction is zero. As such, equation (5) may be rewritten as:

$$\sigma'_{ij}(r_t) = \sigma_{ij}(r_t) - k\delta\sigma_{ij} \approx \sigma_{ij}^f(r_t), \quad (6)$$

where k is a scalar correction factor that goes to zero when $\sigma_m = \sigma_f$. When the mud resistivity is that of OBM (i.e., when $\sigma_m = 0.001$ S/m), k equals one. Assuming linear behavior between k=0 and k=1, then the correction factor takes the form:

$$k = \frac{\sigma_b - \sigma_f}{\sigma_m - \sigma_f}, \quad (7)$$

where $\sigma_b$ is the borehole fluid conductivity (i.e. WBM conductivity), $\sigma_f$ is the formation conductivity, and $\sigma_m$ is the OBM conductivity (referenced in the database and associated with the formation conductivity). As such, for any borehole fluid resistivity, including WBM:

$$\sigma'_{ij}(r_t) = \sigma_{ij}(r_t) - \delta\sigma_{ij}\left(\frac{\sigma_b - \sigma_f}{\sigma_m - \sigma_f}\right), \quad (8)$$

which may be optimized for $\delta\sigma_{ij}$ such that $\bar{\sigma}_{ij}(r_t) \rightarrow \sigma_f$. For example, equation (8) may be approximated with the following quadratic equation:

$$\sigma'^2_{ij} - \sigma'_{ij}(\sigma_m - \sigma_{ij}) + \sigma_{ij}\sigma_m + \delta\sigma_{ij}(\sigma_f - \sigma_b) = 0, \quad (9)$$

In a generalized form, the various embodiments of the correction factor may be written as:

$$k = \frac{F(\sigma_b) - F(\sigma_f)}{F(\sigma_m) - F(\sigma_f)}, \quad (10)$$

where F denotes an analytic function. For example, F may be an exponential or polynomial function.

By using the above correction factor, the borehole correction database compiled for OBM, which may include millions of elements, need not be recompiled for WBM. Rather, the correction factor may modify OBM workflows already in place to convert them to WBM workflows with little disruption.

Figure 7:
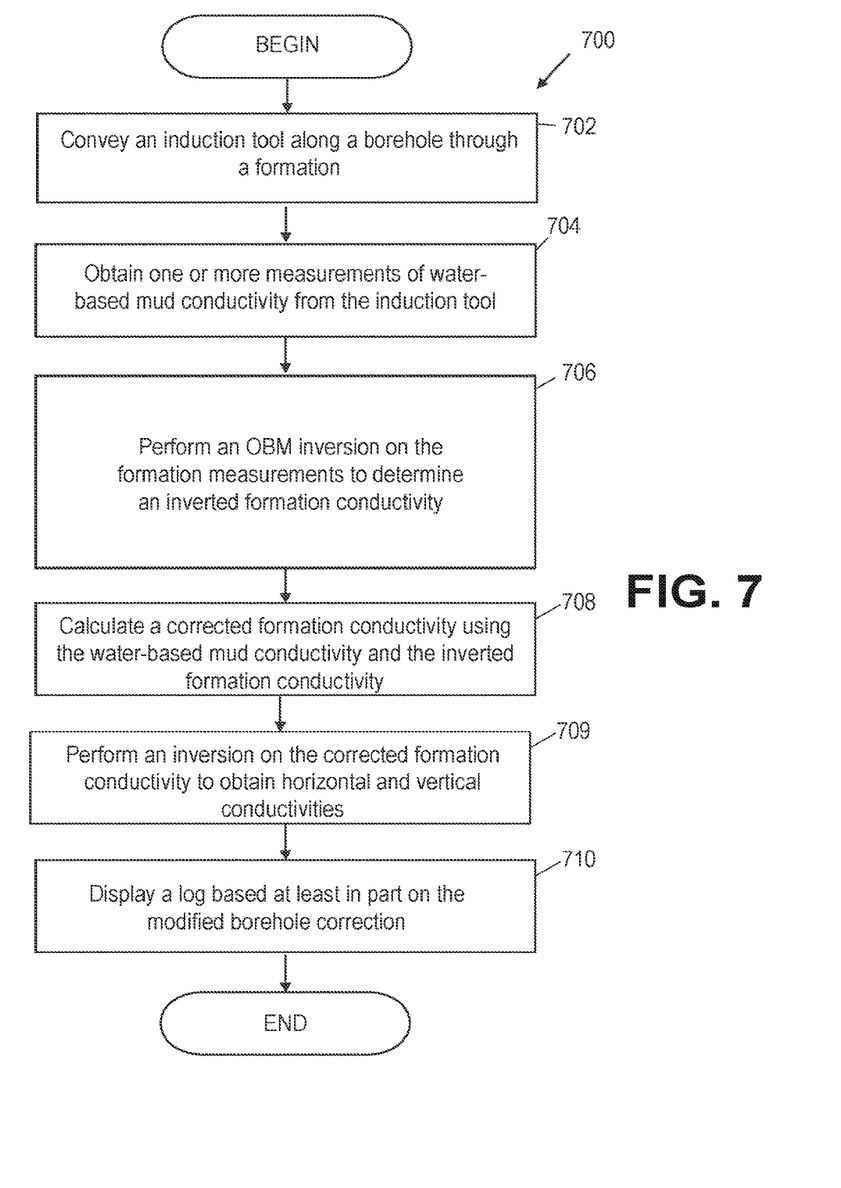
FIG. 7 is a flow diagram showing an illustrative method for borehole correction for WBM.

FIG. 7 is a flow diagram of an illustrative method of borehole correction for WBM, which may be implemented by the systems illustrated in FIGS. 1 and 2. At 702, an induction logging tool is conveyed along a borehole through a formation, e.g., as a wireline tool or a LWD tool. The borehole is filled with WBM. As the tool is being conveyed along the borehole, it acquires one or more formation measurements as a function of the tool's position in the borehole such as the components of the apparent conductivity tensor.

At 704, the WBM conductivity is obtained. The WBM conductivity may be obtained based on a mud cell measurement. For example, a portion of the mud may be passed through a mud cell assembly, in order to measure resistive properties, including a mud resistivity cell, a resistivity bridge, and a hydraulic cylinder to pump the mud into the cell and to maintain the desired pressure on the mud. The mud resistivity cell serves as a mud press and includes a metallic supporting bottom plate, a metallic supporting top plate, and a metallic supporting cylindrical case. The metal may be aluminum, and the cell may also include a non-conducting bottom liner, a non-conducting cylindrical liner, and a non-conducting top liner.

At 706, an OBM inversion is performed on the formation measurements. An inversion is a mathematical process by which $\alpha$, $\phi_{dip}$, $\phi_{ecc}$, $d_{ecc}$, $\sigma_f$, and other model parameters are iteratively modified to generate a model that is consistent with the data. For example, a cost function of the difference between the model and the formation measurements may be iteratively minimized until the model parameters converge. An inversion may be performed on three orthogonal components of the responses simultaneously or on each of three orthogonal components of the responses separately. If the latter, the results of the separate inversions may subsequently be combined. Here, an additional input is used to modify the OBM inversion process for a WBM environment.

Figure 8:
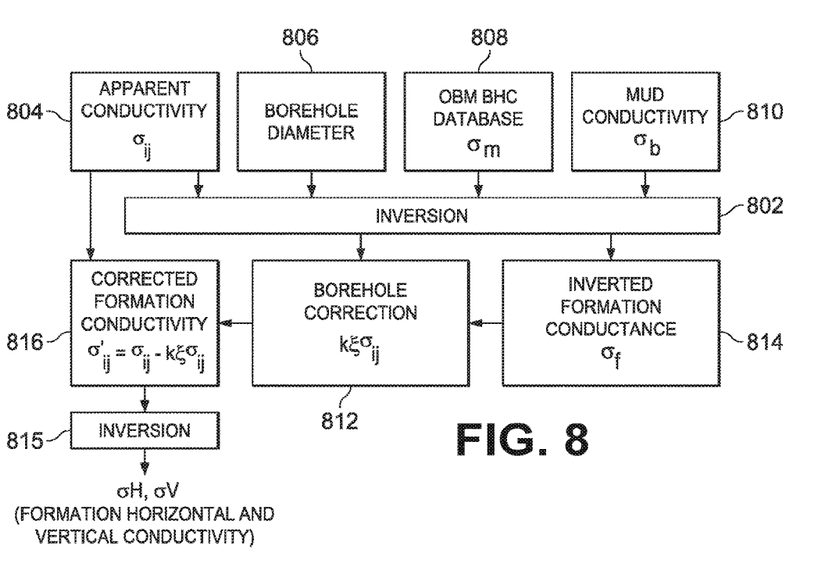
FIG. 8 is a diagram showing illustrative inputs and outputs of an inversion process.

FIG. 8 illustrates the inputs and outputs to the inversion process 802. Specifically, the inputs to the inversion process are the apparent conductivity 804 ($\sigma_{ij}$), the borehole diameter 806, the conductivity of OBM 808 ($\sigma_m$) used to generate the borehole correction database, and the WBM mud conductivity 810 ($\sigma_b$) measured by the mud cell or estimated from the tool measurements. The WBM mud conductivity 810 is the additional input used to modify an OBM inversion process for a WBM environment. Using these inputs, the inversion algorithm is performed to determine the unknown model parameters $\alpha$, $\phi_{dip}$, $\phi_{ecc}$, $d_{ecc}$, and $\sigma_f$ as described above. These model parameters are used to predict tool responses in models with and without a borehole. The differences between these predicted tool responses in conjunction with the inverted formation conductance 814 ($\sigma_f$) is the borehole correction 812 ($k\delta\sigma_{ij}$), including the borehole correction factor k. The difference between the apparent conductivity and the borehole correction term including the correction factor is the corrected formation conductivity 816 of equation (6) as described below. The corrected formation conductivity is used as input to a second inversion process 815 to determine the unknown model parameters $\sigma_H$ (horizontal conductivity) and $\sigma_v$ (vertical conductivity).

Returning to FIG. 7, at 708, a corrected formation conductivity is calculated using the WBM conductivity and the inverted formation conductivity. Specifically, the corrected formation conductivity includes a factor, k, that modifies the OBM correction term into a WBM correction term. The factor may equal $$\frac{\sigma_b - \sigma_f}{\sigma_m - \sigma_f},$$

where $\sigma_b$ is the WBM conductivity, $\sigma_f$ is the inverted conductivity of the formation, and $\sigma_m$ is the OBM conductivity associated with the formation conductivity in the database.

At 709, an inversion is performed on the corrected formation conductivity to determine the unknown model parameters $\sigma_H$ (horizontal conductivity) and $\sigma_v$ (vertical conductivity) as described above.

At 710, a log is displayed or output for display based at least in part on the corrected formation conductivity. The log may be a resistivity log, and may be displayed as described with respect to FIGS. 1 and 2. The corrected formation conductivity reduces or eliminates borehole effects from logging measurements in the log in a WBM environment without recompiling the OBM database and without replacing OBM workflows currently in place. Rather, the borehole correction factor modifies existing OBM workflows in the WBM context.

Figure 9:
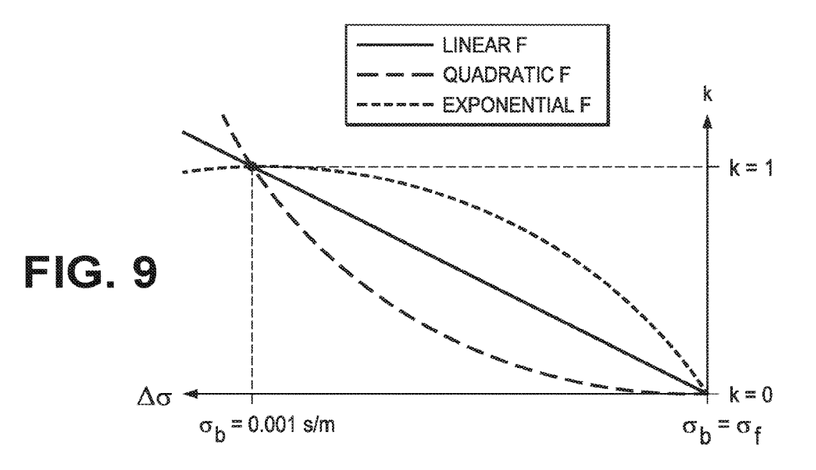
FIG. 9 is a chart showing illustrative modeling of a correction factor as a function of WBM conductivity.

As described with respect to equation (7), a linear behavior of the correction factor was assumed between k=0 and k=1. However, other types of behavior may be tested and employed, if appropriate. FIG. 9 illustrates a linear, quadratic, and exponential behavior of the relationship. Specifically, k=1 when $\sigma_m$=0.001 S/m (the conductivity corresponding to the OBM resistivity of 1,000 Ωm), and k=0 when $\sigma_m$=$\sigma_f$. The relation between k=0 and 1 can be assumed to a function, whether linear, polynomial (e.g., quadratic), or exponential. In this way the factor, k, may be modeled to behave as a linear, quadratic, or exponential, function of the WBM conductivity.

In at least one embodiment, a method of borehole correction for water-based mud includes conveying an induction logging tool along a borehole through a formation, obtaining one or more formation measurements using the tool, obtaining a water-based mud conductivity, performing an oil-based mud inversion on the formation measurements to determine an inverted formation conductivity, calculating a corrected formation conductivity using the water-based mud conductivity and the inverted formation conductivity, and displaying a log based at least in part on the corrected formation conductivity.

In another embodiment, a logging system with borehole correction for water-based mud includes an induction logging tool conveyed along a borehole through a formation. The tool includes triaxial transmitters and triaxial receivers. The system further includes one or more processors to obtain one or more formation measurements using the tool, obtain a water-based mud conductivity, perform an oil-based mud inversion on the formation measurements to determine an inverted formation conductivity, and calculate a corrected formation conductivity using the water-based mud conductivity and the inverted formation conductivity.

The following features may be incorporated into the various embodiments described above, such features incorporated either individually in or conjunction with one or more of the other features. The corrected formation conductivity may reduce borehole effects from logging measurements in the log. The water-based mud conductivity may be obtained based on a mud cell measurement. The water-based mud conductivity may be obtained from the formation measurements. The corrected formation conductivity may include a factor that modifies the inverted formation conductivity. The factor may equal $$\frac{\sigma_b - \sigma_f}{\sigma_m - \sigma_f},$$

where $\sigma_b$ is the water-based mud conductivity, $\sigma_m$ is an oil-based mud conductivity associated with the oil-based mud correction, and $\sigma_f$ is a conductivity of the formation. The factor may be modeled to behave as a linear function of the water-based mud conductivity. The factor may be modeled to behave as a quadratic function of the water-based mud conductivity. The factor may be modeled to behave as an exponential function of the water-based mud conductivity. An inversion may be performed on the corrected formation conductivity to obtain horizontal and vertical conductivities.

Numerous variations and modifications will become apparent to those skilled in the art once the above disclosure is fully appreciated. The ensuing claims are intended to cover such variations where applicable.

What is claimed is:

1. A method of borehole correction for water-based mud comprising:
    conveying an induction logging tool along a borehole through a formation, wherein the induction logging tool comprises a tilted transmit antenna and at least one tilted receive antenna;
    transmitting an electromagnetic field from the tilted transmit antenna into the formation;
    recording one or more formation measurements with the at least one tilted receive antenna;
    generating a water-based mud conductivity from a mud cell measurement;
    applying an oil-based mud inversion on the one or more formation measurements to determine an inverted formation conductivity, wherein the oil-based mud inversion is based on a cost function;
    obtaining a corrected formation conductivity, wherein the corrected formation conductivity comprises a factor that is calculated from the water-based mud conductivity and an oil-based mud conductivity; and
    displaying a log based at least in part on the corrected formation conductivity.

2. The method of claim 1, wherein the corrected formation conductivity substantially eliminates the borehole effects from logging measurements in the log.

3. The method of claim 1, further comprising performing an inversion on the corrected formation conductivity to obtain horizontal and vertical conductivities.

4. The method of claim 1, wherein the water-based mud conductivity is obtained based on a mud cell measurement.

5. The method of claim 1, wherein the water-based mud conductivity is obtained from the formation measurements.

6. The method of claim 1, wherein the corrected formation conductivity modifies the inverted formation conductivity.

7. The method of claim 6, wherein the factor equals $$\frac{\sigma_b - \sigma_f}{\sigma_m - \sigma_f},$$

where $\sigma_b$ is the water-based mud conductivity is, $\sigma_m$ is an oil-based mud conductivity associated with the oil-based mud correction, and $\sigma_f$ is a conductivity of the formation.

8. The method of claim 6, further comprising modeling the factor to behave as a quadratic function of the water-based mud conductivity.

9. The method of claim 6, further comprising modeling the factor to behave as an exponential function of the water-based mud conductivity.

10. The method of claim 1, wherein the borehole comprises a water-based mud.

11. The method of claim 1, wherein the at least one tilted receive antenna comprises two pairs of tilted receive antennas and wherein the two pairs of tilted receive antennas are perpendicular to the transmit antenna.

12. A logging system for borehole correction for water-based mud comprising:
    an induction logging tool comprises:
        a tilted transmit antenna, wherein the tilted transmit antenna transmits an electromagnetic field; and
        at least one tilted receive antenna, wherein the at least one tilted receive antenna records one or more formation measurements;
    one or more processors coupled to the induction logging tool to:
        generate a water-based mud conductivity from the one or more formation measurements;
        apply an oil-based mud inversion on the formation measurements to determine an inverted formation conductivity; and
        obtain a corrected formation conductivity, wherein the corrected formation conductivity comprises a factor that is calculated from the water-based mud conductivity and an oil-based mud conductivity.

13. The system of claim 12, wherein the corrected formation conductivity substantially eliminates the borehole effects from logging measurements in the log.

14. The system of claim 12, wherein the one or more processors perform an inversion on the corrected formation conductivity to obtain horizontal and vertical conductivities.

15. The system of claim 12, wherein the one or more processors obtain water-based mud conductivity based on a mud cell measurement.

16. The system of claim 12, wherein the one or more processors obtain water-based mud conductivity base on the formation measurements.

17. The system of claim 12, wherein the corrected formation conductivity modifies the inverted formation conductivity.

18. The system of claim 17, wherein the factor equals $$\frac{\sigma_b - \sigma_f}{\sigma_m - \sigma_f},$$

where $\sigma_b$ is the water-based mud conductivity, $\sigma_m$ is an oil-based mud conductivity associated with the oil-based mud correction, and $\sigma_f$ is a conductivity of the formation.

19. The system of claim 17, wherein the one or more processors model the factor to behave as a linear function of the water-based mud conductivity.

20. The system of claim 17, wherein the one or more processors model the factor to behave as a quadratic function of the water-based mud conductivity.

21. The system of claim 17, Wherein the one or more processors model the factor to behave as an exponential function of the water-based mud conductivity.

22. The system of claim 12, wherein the one or more processors output for display a log based at least in part on the corrected formation conductivity.

23. The system of claim 12, wherein the electromagnetic field is transmitted through a water-based mud.

24. The system of claim 12, wherein the at least one tilted receive antenna comprises two pairs of tilted receive antennas and wherein the two pairs of tilted receive antennas are perpendicular to the transmit antenna.

25. A method of borehole correction for water-based mud comprising:
   conveying an induction logging tool along a borehole through a formation, wherein the induction logging tool comprises a tilted transmit antenna and at least one tilted receive antenna;
   transmitting an electromagnetic field from the tilted transmit antenna into the formation;
   recording one or more formation measurements with the at least one tilted receive antenna;
   generating a water-based mud conductivity from a mud cell measurement;
   applying an oil-based mud inversion on the one or more formation measurements to determine model parameters, wherein inputs to the oil-based inversion comprise apparent conductivity, borehole diameter, a conductivity of an oil-based used to generate a borehole correction database,. water based mud conductivity, wherein model parameters comprise relative dip angle, relative dip azimuth, tool eccentricity, tool eccentricity displacement, and formation conductivity;
   predicting tool responses based on the model parameters in models with and without the borehole:
   determining a borehole correction comprising a borehole correction factor based on differences between the predicted tool response and an inverted formation conductance, wherein the borehole correction factor comprises:

$$k = \frac{F(\sigma_b) - F(\sigma_f)}{F(\sigma_m) - F(\sigma_f)},$$

wherein F is an analytic function that is exponential or polynomial, where $\sigma_b$ is the water-based mud conductivity, $\sigma_f$ is the formation conductivity, and $\sigma_m$ is the conductivity of the oil-based used to generate the borehole correction database;
   determining a corrected formation conductivity based on differences between the apparent conductivity and the borehole correction including the borehole correction factor;
   applying a second inversion process on the corrected formation conductivity to determine the model parameters horizontal conductivity and vertical conductivity;
   determining the corrected formation conductivity with water based mud conductivity, the inverted formation conductivity, and the borehole correction factor, wherein the borehole correction factor comprises:

$$\frac{\sigma_b - \sigma_f}{\sigma_m - \sigma_f},$$

where $\sigma_b$, is the WBM conductivity, $\sigma_f$ is the inverted conductivity of the formation, and $\sigma_m$ is the OBM conductivity associated with the formation conductivity in the database; and
   applying the second inversion process on the corrected formation conductivity with water based mud conductivity to determine horizontal conductivity and vertical conductivity; and
   displaying a log based at least in part on the corrected formation conductivity.

* * * * *